United States Patent
Cheng et al.

(10) Patent No.: US 7,719,202 B2
(45) Date of Patent: May 18, 2010

(54) LIGHT EMITTING DIODE DRIVING CIRCUIT

(75) Inventors: Ying-Chang Cheng, Taipei Hsien (TW); Shih-Hung Liu, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 240 days.

(21) Appl. No.: 11/892,899

(22) Filed: Aug. 28, 2007

(65) Prior Publication Data

US 2008/0093999 A1    Apr. 24, 2008

Related U.S. Application Data

(63) Continuation-in-part of application No. 11/584,595, filed on Oct. 23, 2006, now Pat. No. 7,436,128.

(51) Int. Cl.
*H05B 37/02* (2006.01)
(52) U.S. Cl. .................. 315/291; 315/224; 315/307
(58) Field of Classification Search ............. 315/209 R, 315/224, 272, 276, 291, 307, 225
See application file for complete search history.

(56) References Cited

U.S. PATENT DOCUMENTS

| | | | |
|---|---|---|---|
| 5,517,086 A | 5/1996 | El-Hamamsy et al. | |
| 6,297,613 B1 | 10/2001 | Elliott et al. | |
| 6,515,437 B1 * | 2/2003 | Zinkler et al. | 315/312 |
| 6,667,586 B1 | 12/2003 | Blau | |
| 6,747,421 B2 * | 6/2004 | Kohn | 315/291 |
| 6,827,466 B2 * | 12/2004 | Tsai | 362/231 |
| 6,909,622 B2 | 6/2005 | Weng | |
| 7,038,354 B2 * | 5/2006 | Takeda et al. | 310/316.01 |
| 7,061,781 B2 | 6/2006 | Heckmann et al. | |

FOREIGN PATENT DOCUMENTS

| | | |
|---|---|---|
| TW | 519854 | 2/2003 |
| TW | M242969 | 9/2004 |
| TW | M290932 | 5/2006 |

* cited by examiner

*Primary Examiner*—Douglas W Owens
*Assistant Examiner*—Jimmy T Vu
(74) *Attorney, Agent, or Firm*—Muncy, Geissler, Olds, & Lowe, PLLC

(57) ABSTRACT

A LED driving circuit mainly includes a commutation unit to transform an AC input cycle signal to a DC cycle signal, a switch unit which divides a driving power signal output to a LED and has a duty voltage value, a valley filled power factor correction circuit to receive the AC input cycle signal and stop conduction of the commutation unit when the voltage value of the AC input cycle signal is lower than a cutoff voltage value, and a piezoelectric inverter to receive the driving power signal of the switch unit and regulate the signal to an AC modulated power signal within a duty range of the LED to drive the LED to emit light.

5 Claims, 10 Drawing Sheets

LIGHT EMITTING DIODE DRIVING CIRCUIT

This application is a continuation-in-part, and claims priority, of from U.S. patent application Ser. No. 11/584,595 filed on Oct. 23, 2006, now U.S. Pat. No. 7,436,128 entitled "DRIVING CIRCUIT FOR HOT CATHODE FLUORESCENT LAMPS".

FIELD OF THE INVENTION

The present invention relates to a driving circuit and particularly to a light emitting diode (LED) driving circuit.

BACKGROUND OF THE INVENTION

With introduction of high luminosity LED and well developed technology of white light LED, LED illumination products adopted for desk lamps, projection lamps and the like also have been developed that are very likely to replace the conventional incandescent lamps in the future to become the main lighting sources of indoor illumination. Most conventional LED driving circuits adopt a Charge-Pump circuit mode or a Boost-Buck circuit mode. These two types of driving circuits still leave a lot to be desired as far as efficiency is concern.

Take the charge-pump circuit mode for instance. Its efficiency curve is averaged at 60-70%, and might be as low as 50%. It also provides a limited range of output voltage (limited to two times of input voltage). To drive multiple LEDs, the LEDs have to be coupled in parallel, and current-limit resistors have to be added to prevent uneven current and uneven illumination. As a result, the cost is higher, and more energy is wasted on the additional elements, and efficiency also is lower. On the other hand, the boost-buck circuit mode adopts inductors that make circuit design more complicated. To drive multiple LEDs the high cost inductors have to withstand a greater current during energy transformation. Hence it also is not a desirable LED driving circuit. How to provide a more efficient driving circuit is a big issue in LED related industries.

SUMMARY OF THE INVENTION

The primary object of the present invention is to provide a driving circuit to directly drive LEDs through AC signals to improve power utilization efficiency.

Another object of the invention is to provide a circuit to drive LEDs that is low cost and adopts a simple design.

Yet another object of the invention is to prevent an input end of a switch unit from accumulating power and resulting in pierced through or damaged.

Still another object of the invention is to overcome electromagnetic interference (EMI) problem.

To achieve the foregoing objects, the invention provides a LED driving circuit than mainly includes a commutation unit to transform an AC input cycle signals to a DC cycle signal, a switch unit to divide driving power signals to be sent to a LED that have a duty voltage value, and a valley filled power factor correction circuit which receives the AC input cycle signals and stops a conductive condition of the commutation unit when the voltage value of the AC input cycle signals is lower than a cutoff voltage value. The cutoff voltage value is higher than a duty voltage value of the switch unit. The invention also includes a piezoelectric inverter which receives a driving power signal of the switch unit and regulates the signal to become an AC modulated power signal within a duty range of the LED to drive the LED to emit light.

Yet another object of the invention is to prohibit damages caused by arc discharging.

To accomplish the object set forth above an arc discharge protection unit is provided in a high voltage reaction zone formed between the commutation unit and the piezoelectric inverter to detect an arc discharge effect and stop the driving power signal of the LED.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
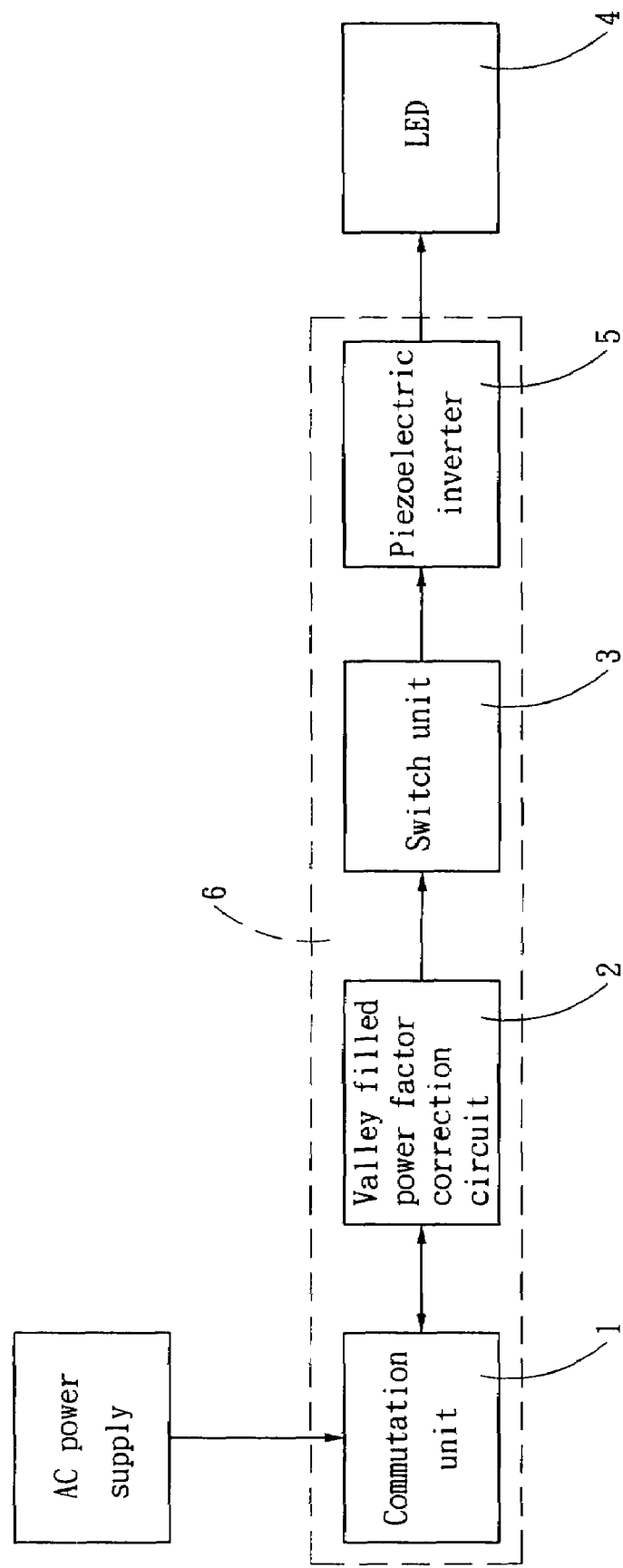
FIG. 1 is a block diagram of an embodiment of the invention.
Figure 2:
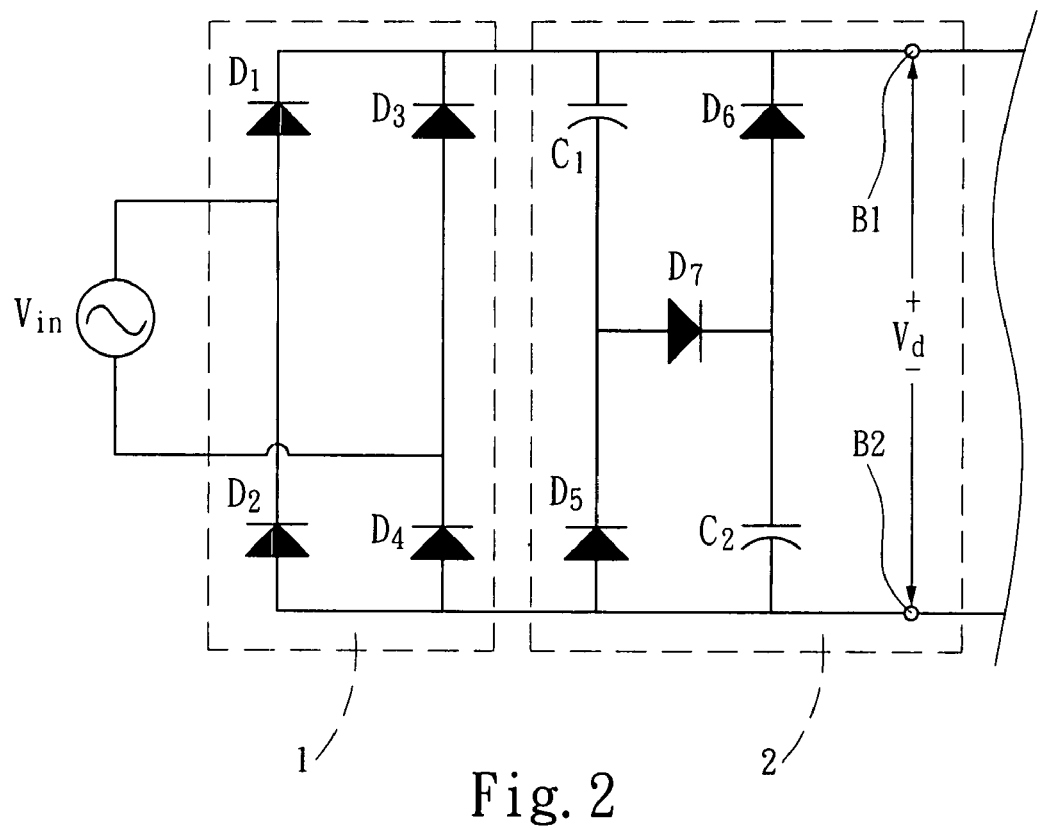
FIG. 2 is a circuit diagram of a commutation unit and a valley filled power factor correction circuit according to an embodiment of the invention.
Figure 3A:
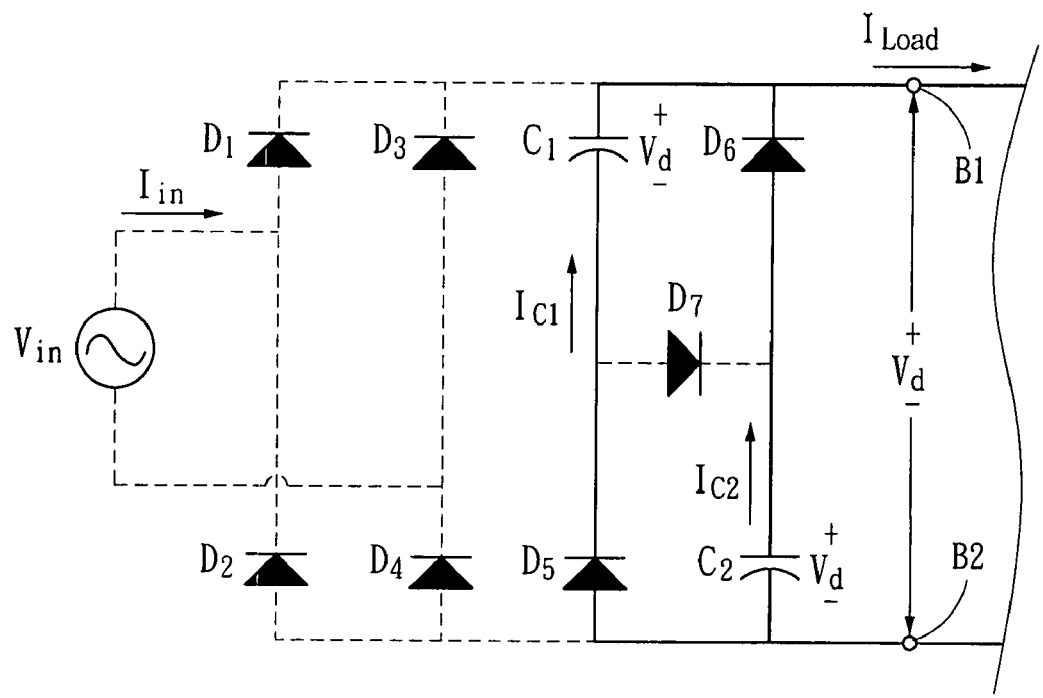
FIG. 3A is an equivalent circuit diagram of duty mode I of a commutation unit and a valley filled power factor correction circuit according to an embodiment of the invention.
Figure 3B:
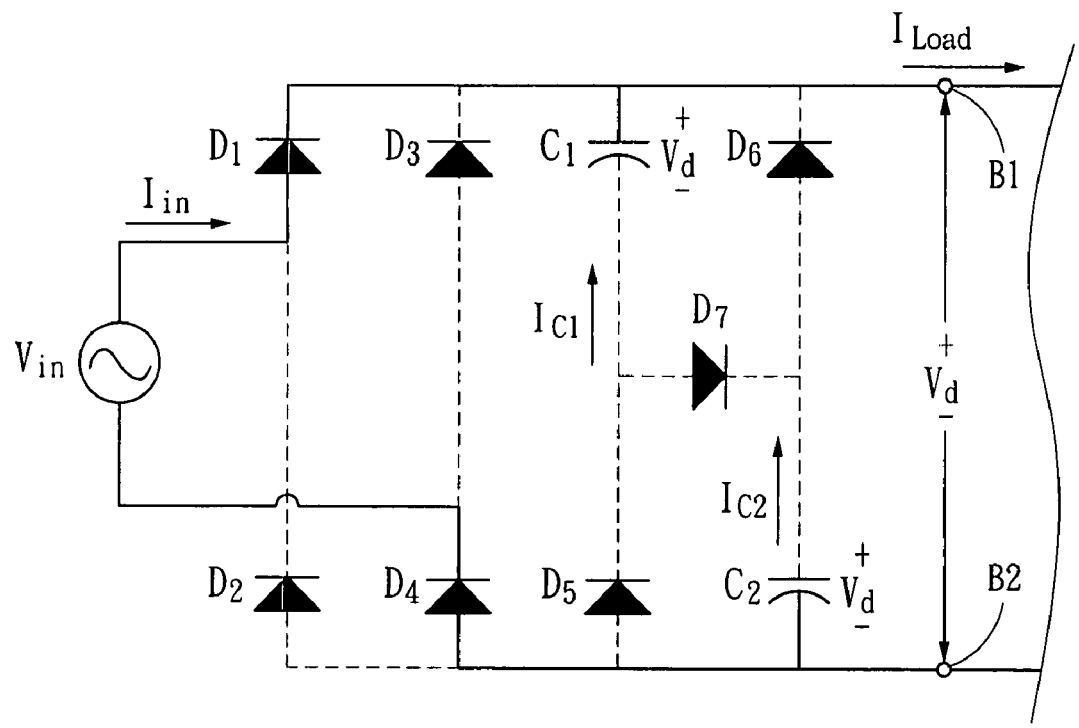
FIG. 3B is an equivalent circuit diagram of duty mode II of a commutation unit and a valley filled power factor correction circuit according to an embodiment of the invention.
Figure 3C:
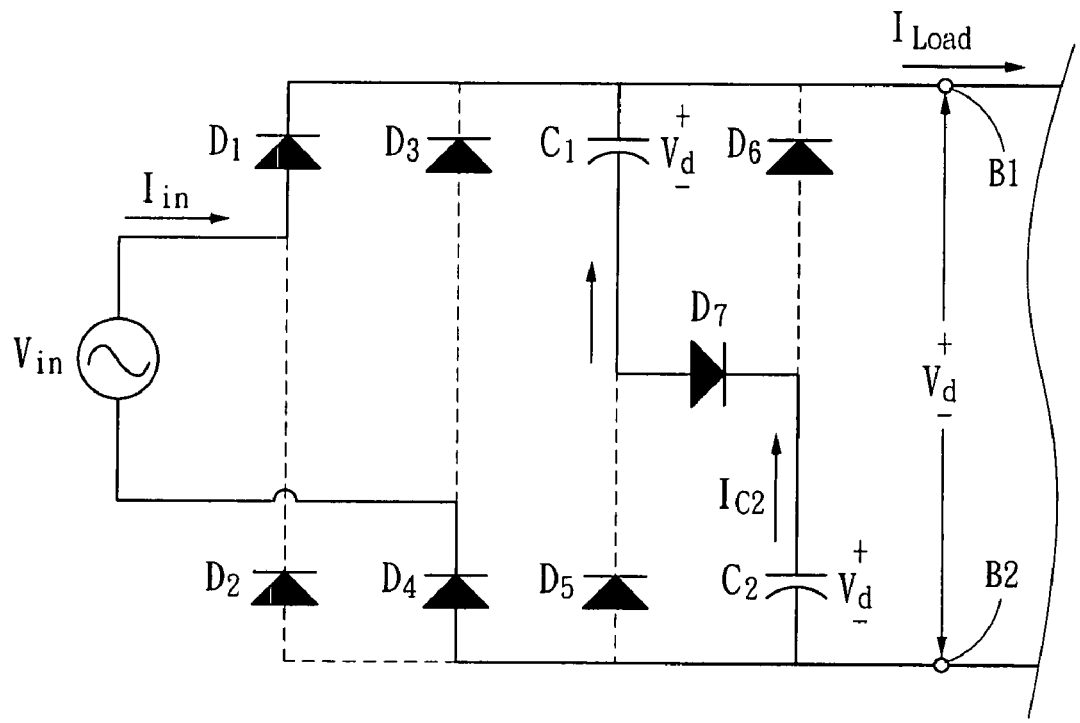
FIG. 3C is an equivalent circuit diagram of duty mode III of a commutation unit and a valley filled power factor correction circuit according to an embodiment of the invention.
Figure 4:
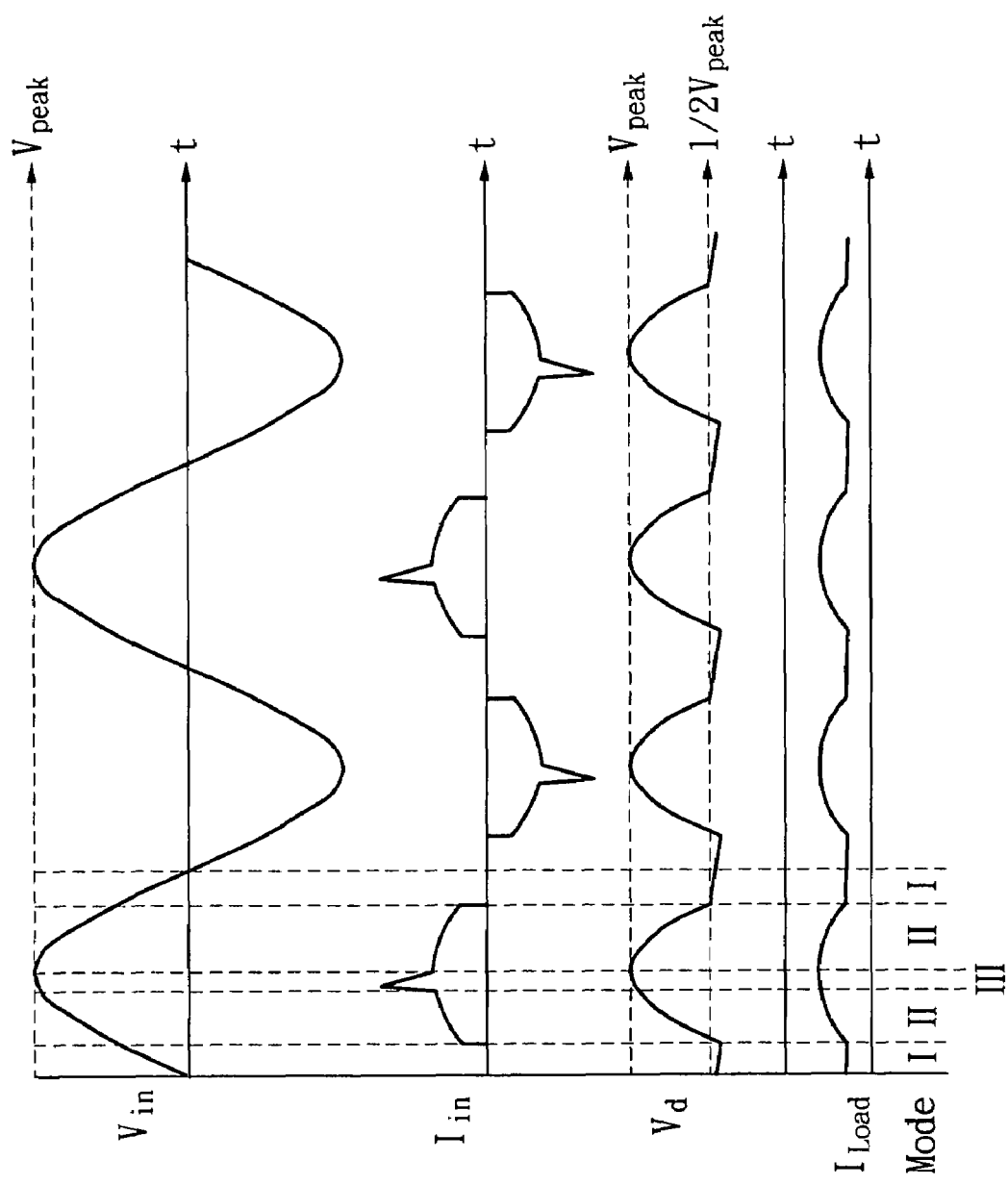
FIG. 4 is a waveform chart of a commutation unit and a valley filled power factor correction circuit in a duty mode according to an embodiment of the invention.

Please refer to FIGS. 1 and 2 for a block diagram and a circuit diagram of a commutation unit and a valley filled power factor correction circuit according to an embodiment of the invention.

The invention provides a LED driving circuit that mainly includes:

a commutation unit 1 to transform an AC input cycle signal Vin from an AC power supply to a DC cycle signal. In this embodiment the commutation unit 1 is a full bridge rectifier consisting of D1-D4. It has a first output end B1 and a second output end B2.

Table 1 below shows circuit conditions of a valley filled filter in various duty modes according to an embodiment of the invention.

TABLE 1

| Duty mode | Voltage condition | Diode condition ON | Diode condition OFF | Current condition |
|---|---|---|---|---|
| I | $\|Vin\| < Vcp$; $Vd = Vcp$ | D5, D6 | Other | $Iin = 0$; $I_{Load} = I_{C1} + I_{c2}$ |
| II | $Vcp < \|Vin\| < Vcs$; $Vd = \|Vin\|$ | D1, D4; Vin > 0 D2, D3; Vin < 0 | Other | $Iin = I_{Load}$; $I_{C1} = I_{c2} = 0$ |
| III | $\|Vin\| > Vcs$; $Vd = \|Vin\|$ | D1, D4, D7; Vin > 0 D2, D3, D7; Vin < 0 | Other | $Iin = I_{Load} - I_{C1}$; $I_{C1} = I_{c2}$ |

Figure 5:
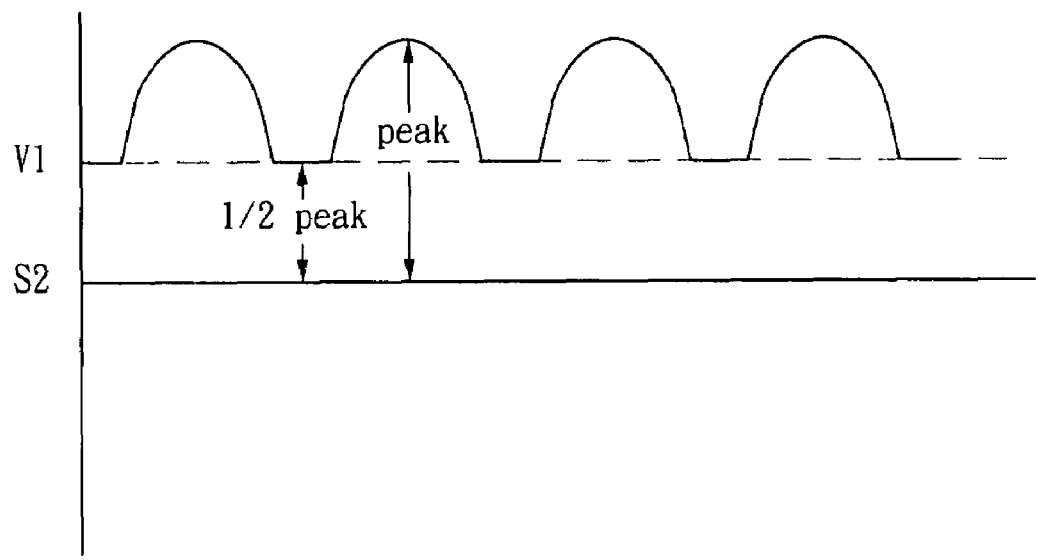
FIG. 5 is a waveform chart of an AC input cycle signal according to an embodiment of the invention.

The invention also includes a valley filled power factor correction circuit 2 to receive the DC cycle signal from the commutation unit 1, and has a cutoff voltage value V1. When the voltage value of the AC input cycle signal Vin is lower than the cutoff voltage value V1 the commutation unit 1 stops conduction. When the voltage value of the AC input cycle signal Vin is higher than or equal to the cutoff voltage value V1 conduction is established to form a filtering condition. In this embodiment the valley filled power factor correction circuit 2 is a passive one and includes a first circuit (not shown in the drawings) consisting of a first capacitor C1 and a first diode D5, and a second circuit (also not shown in the drawings) consisting of a second capacitor C2 and a second diode D6. The first circuit and the second circuit are bridged by a third diode D7. The first circuit and the second circuit are located between the first output end B1 and the second output end B2. The valley filled power factor correction circuit 2 has three duty modes I, II and III (referring to FIGS. 3A, 3B, 3C, 4 and table 1). It is based on a principle that the capacitors C1 and C2 have a charging path and a discharging path that are different. Hence the conduction time period of the commutation unit 1 can be increased, and power factor can be boosted up to 0.95 or more. In addition, the cutoff voltage value V1 is ½ peak value of the AC input cycle signal Vin received by the commutation unit 1 to regulate the waveform to a filtering condition S2 (referring to FIG. 5).

Figure 6:
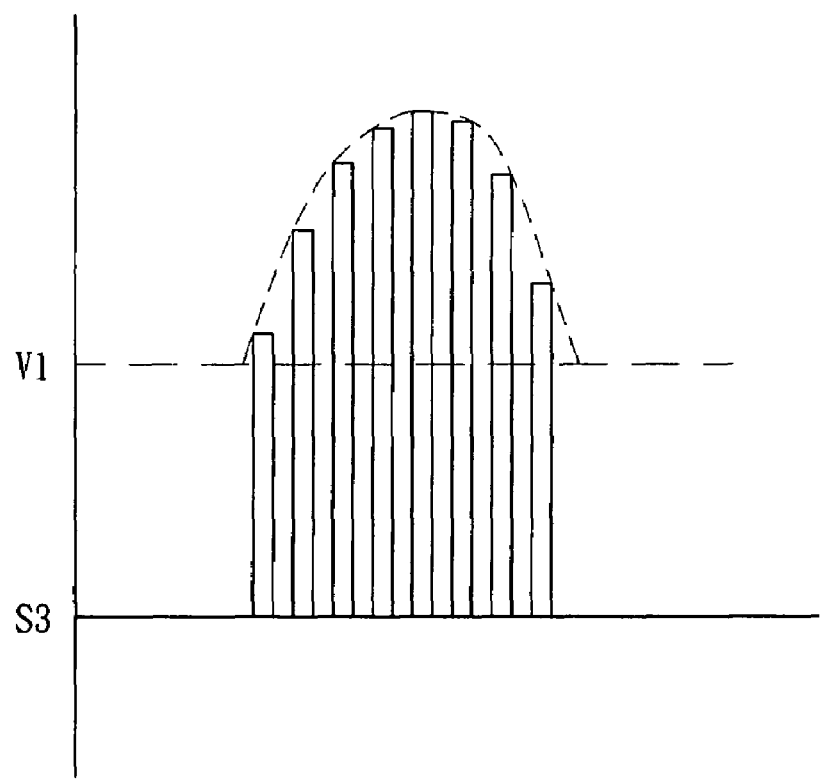
FIG. 6 is a waveform chart of a driving signal according to an embodiment of the invention.
Figure 7:
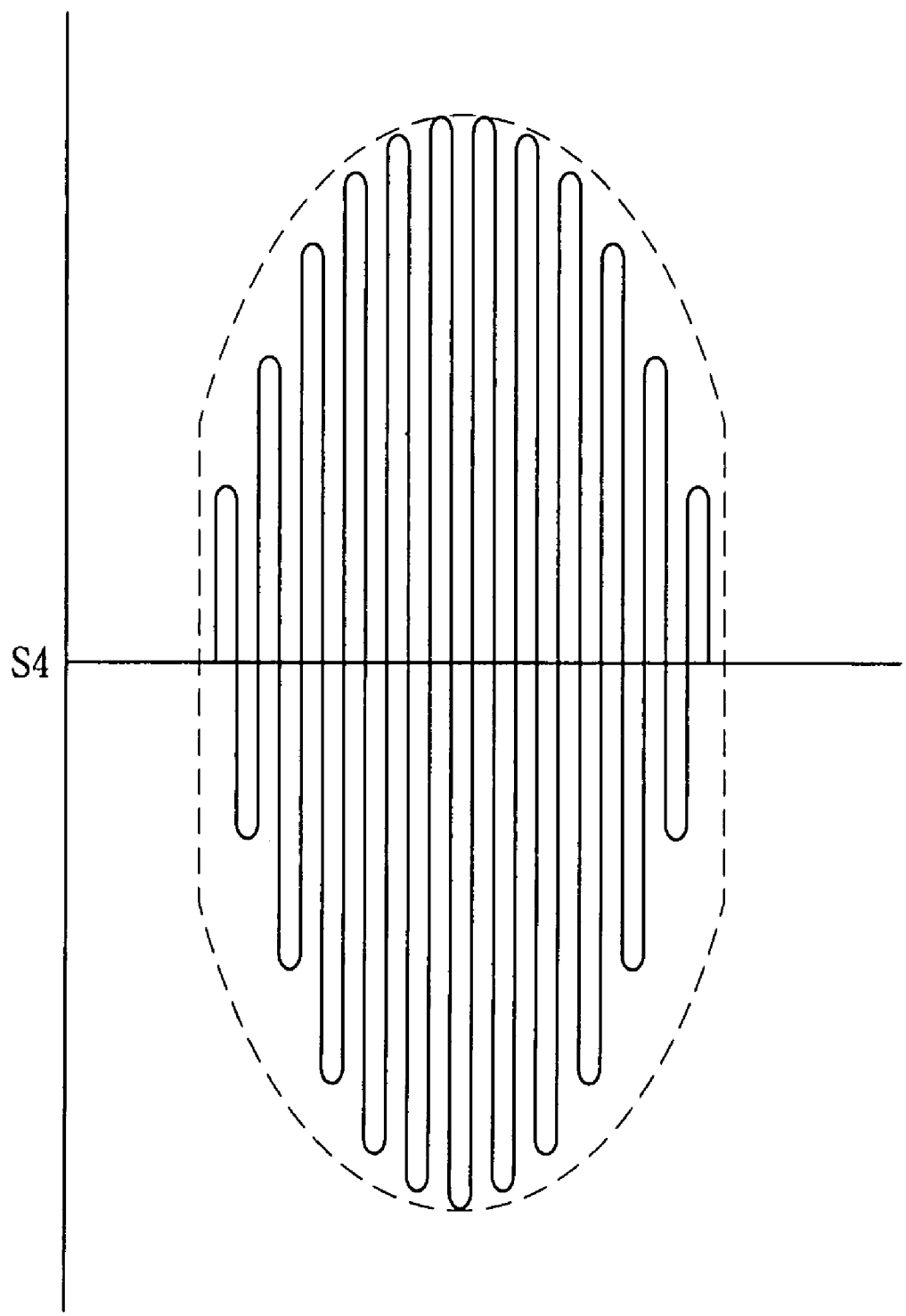
FIG. 7 is a waveform chart of an AC sinusoidal wave signal according to an embodiment of the invention.

The invention further includes a switch unit 3 which has a duty voltage value and divides the driving power output to a LED 4 to output a driving signal S3 (referring to FIG. 6) so that the LED 4 receives the power of an AC sinusoidal signal S4 (referring to FIG. 7) to generate light. The duty voltage value is the minimum voltage value of the power required by the switch unit 3 in an operating condition, and the ½ peak value voltage is greater than the duty voltage. Hence through the valley filled power factor correction circuit 2 the AC input cycle signal lower than the cutoff voltage value V1 can be filtered out before reaching the commutation unit 1. And the voltage value received by the rear end switch unit 3 is sufficient to enable the switch unit 3 to enter the operating condition. Thereby power accumulation that might otherwise occur to the input end of the switch unit 3 can be prevented and piercing of the switch unit 3 can be avoided. In this embodiment the switch unit 3 includes two transistors.

Figure 8:
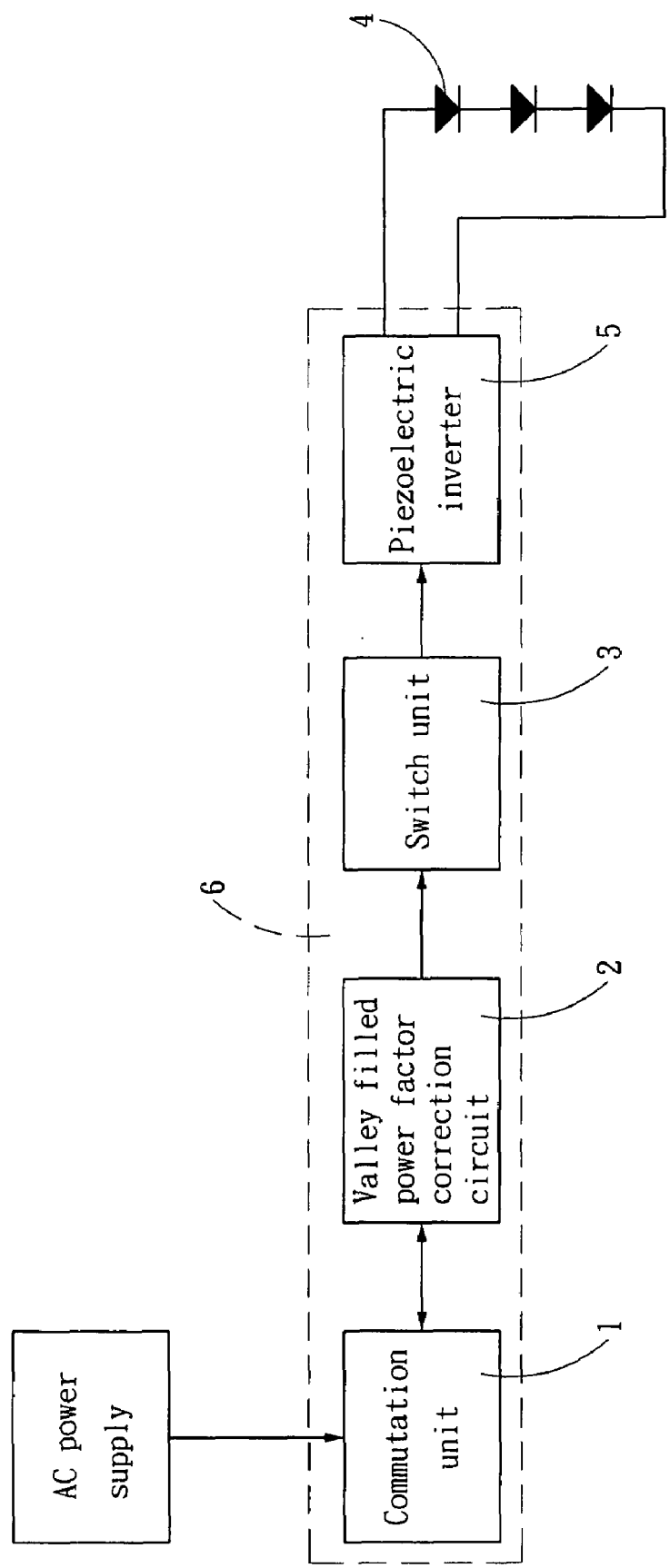
FIG. 8 is a block diagram of another embodiment of the invention showing the LED coupled in series for driving.
Figure 9:
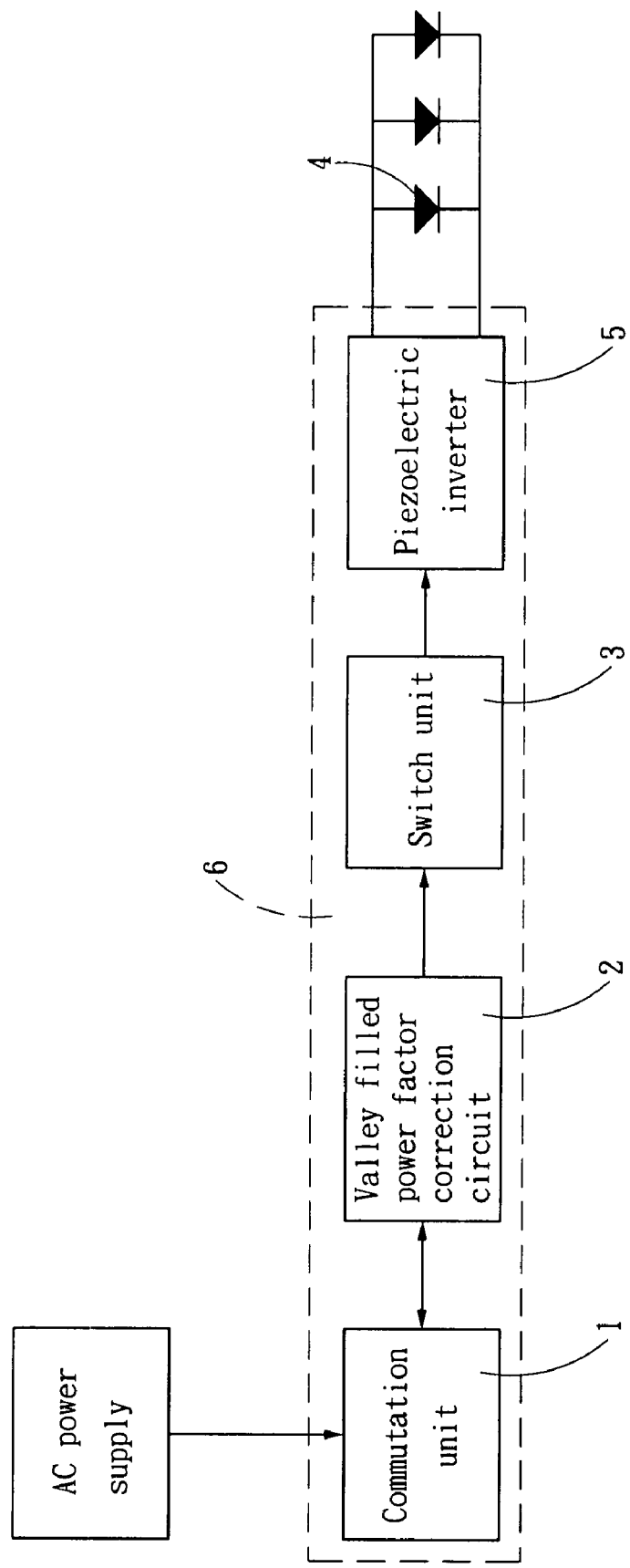
FIG. 9 is a block diagram of yet another embodiment of the invention showing the LED coupled in parallel for driving.

The invention also includes a piezoelectric inverter 5 which receives the driving power signal from the switch unit 3 and regulates the signal to an AC modulated power signal in a duty range of the LED 4 to drive the LED 4 to emit light. The piezoelectric inverter 5 may be made from ceramic. As the LED 4 has a lower impedance, the piezoelectric inverter 5 has to regulate the driving power of the switch unit 3 to match the duty power range of the LED 4 to avoid the power of the piezoelectric inverter 5 to become excessive and damage the LED 4. In order to get an improved power utilization efficiency the LED 4 includes a plurality of LEDs 4 with the same conductive direction. FIG. 8 shows that the LEDs 4 are coupled in series. FIG. 9 shows that the LEDs 4 are coupled in parallel. In practice coupling in series and parallel in a cooperative manner also may be adopted.

Furthermore, the commutation unit 1 and the piezoelectric inverter 5 form a high voltage reaction zone 6 between them that includes an arc discharge protection unit (not shown in the drawings) to detect arc discharge effect to stop the driving power signal of the LED 4. By detecting alterations of the temperature, current, voltage or impedance value generated by the arc discharge effect the driving power signal of the LED 4 is stopped to prevent electronic elements from being damaged and to further avoid the risk caused by the high temperature generated by the arc discharge effect.

Figure 10:
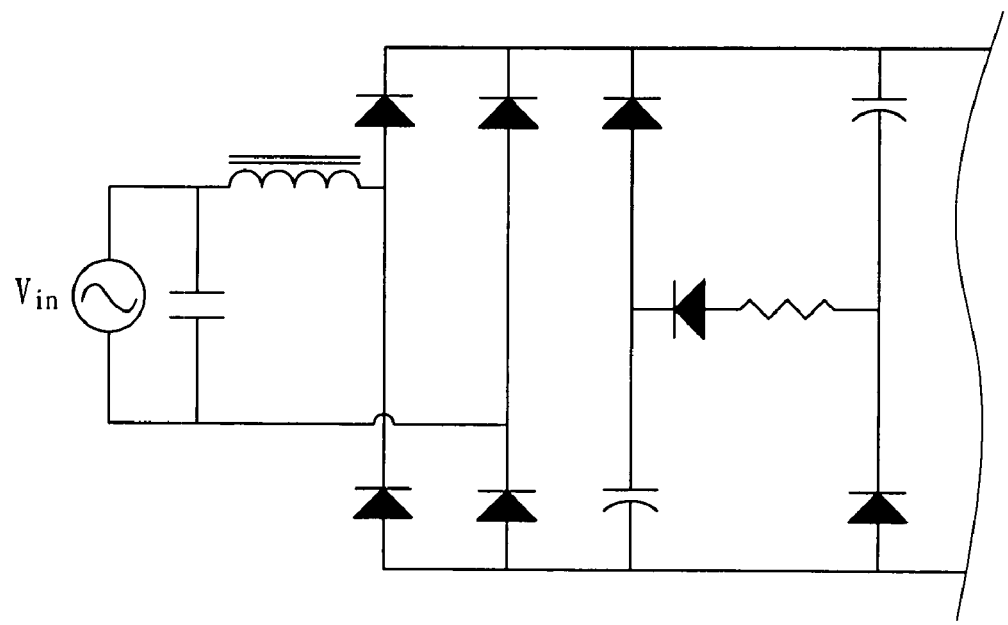
FIGS. 10, 11 and 12 are circuit diagrams of other embodiments of a commutation unit and a valley filled power factor correction circuit of the invention.
Figure 11:
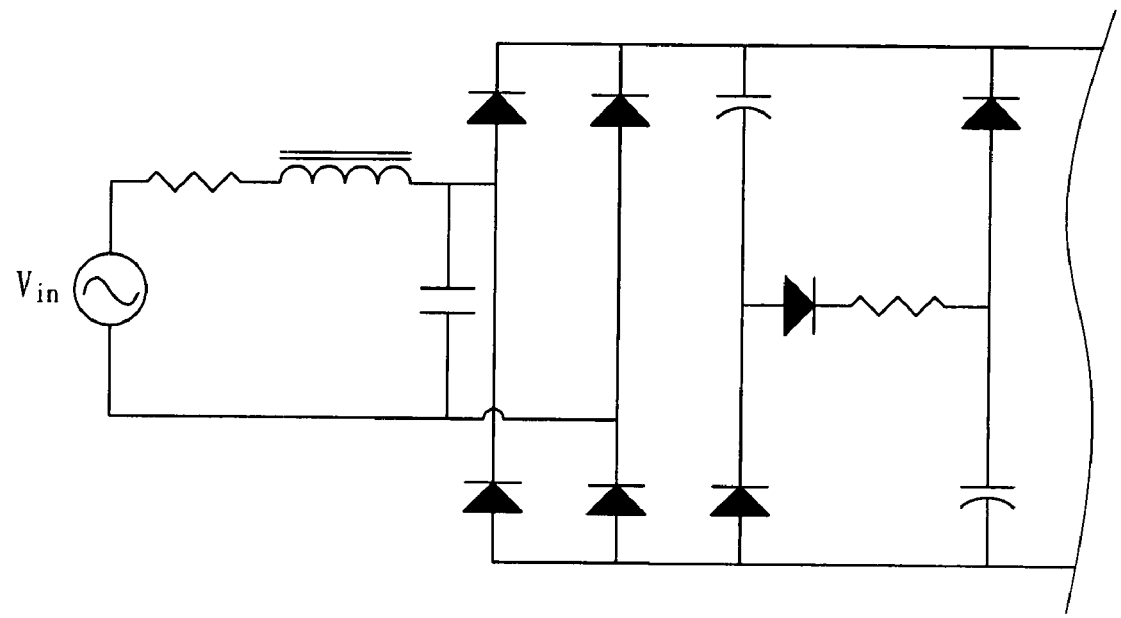
Figure 12:
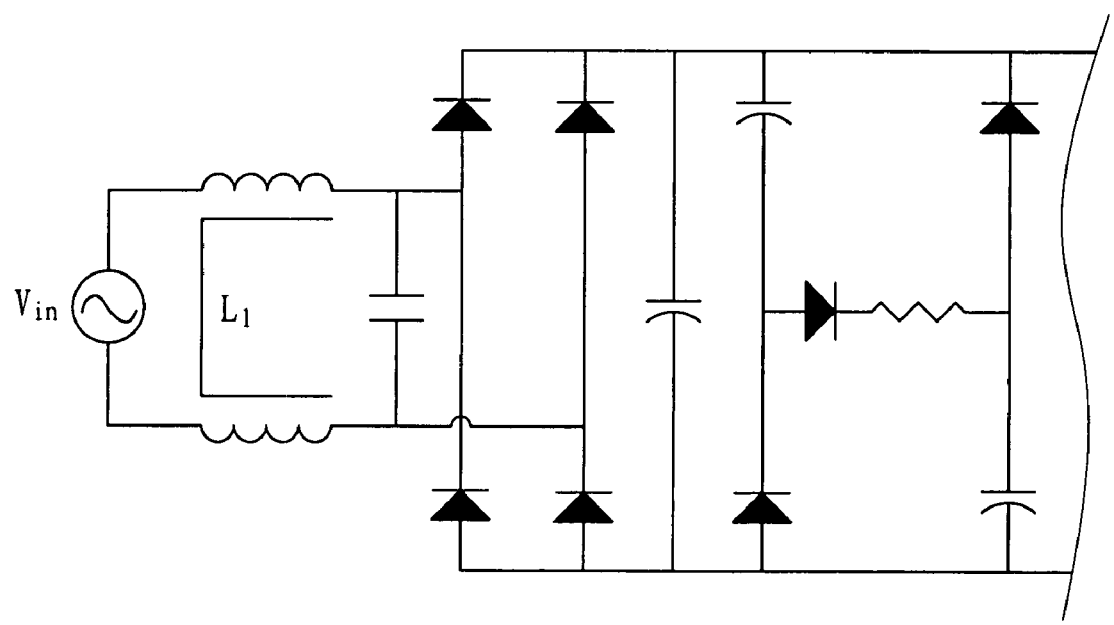

It is to be noted that the commutation unit 1 of the invention and the valley filled power factor correction circuit 2, aside from the circuit design shown in FIG. 2, may also be flexibly altered in response to different power characteristics. FIGS. 10, 11 and 12 show other possible circuit designs that may be adopted.

In short, the invention adopts a LED driving circuit that includes the valley filled power factor correction circuit 2 and the piezoelectric inverter 5. Not only the cost of additional elements that are included in the conventional driving circuits can be saved, the circuit design also is simpler, and energy can be utilized more effectively. Moreover, through the commutation unit 1 and the valley filled power factor correction circuit 2 a portion of the AC input cycle signal Vin with the voltage value lower than the duty voltage value can be filtered out to prevent the voltage of the input signal of the switch unit 3 lower than the duty voltage of the switch unit 3, thereby prevent power accumulation at the input end of the switch unit 3 to prevent piercing or damage of the switch unit 3. Furthermore, the piezoelectric inverter 5 also can overcome EMI problem. Thus the invention provides a significant improvement over the conventional techniques.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A light emitting diode (LED) driving circuit, mainly comprising:
   a commutation unit to transform an AC input cycle signal to a DC cycle signal;
   a switch unit which divides a driving power signal output to a LED and has a duty voltage value;
   a valley filled power factor correction circuit which receives the AC input cycle signal and stops conduction of the commutation unit when the voltage value of the AC input cycle signal is lower than a cutoff voltage value, the cutoff voltage value being higher than the duty voltage value; and
   a piezoelectric inverter which receives the driving power signal of the switch unit and regulates the signal to an AC modulated power signal within a duty range of the LED to drive the LED to emit light;
   wherein the commutation unit has a first output end and a second output end, the valley filled power factor correction circuit having a first circuit and a second circuit that consist respectively of a capacitor and a diode, and are located respectively at the first output end and the second output end, and another diode located between the first circuit and the second circuit.

2. The light emitting diode (LED) driving circuit of claim 1, wherein the LED includes a plurality of LEDs coupled in series that have a same conductive direction.

3. The light emitting diode (LED) driving circuit of claim 1, wherein the LED includes a plurality of LEDs coupled in parallel that have a same conductive direction.

4. The light emitting diode (LED) driving circuit of claim 1, wherein the cutoff voltage value is ½ peak value of the AC driving signal.

5. The light emitting diode (LED) driving circuit of claim 1, wherein the commutation unit and the piezoelectric inverter form a high voltage reaction zone between them that has an arc discharge protection unit located thereon to detect an arc discharge effect to stop the LED driving power signal.

\* \* \* \* \*